UNITED STATES PATENT OFFICE.

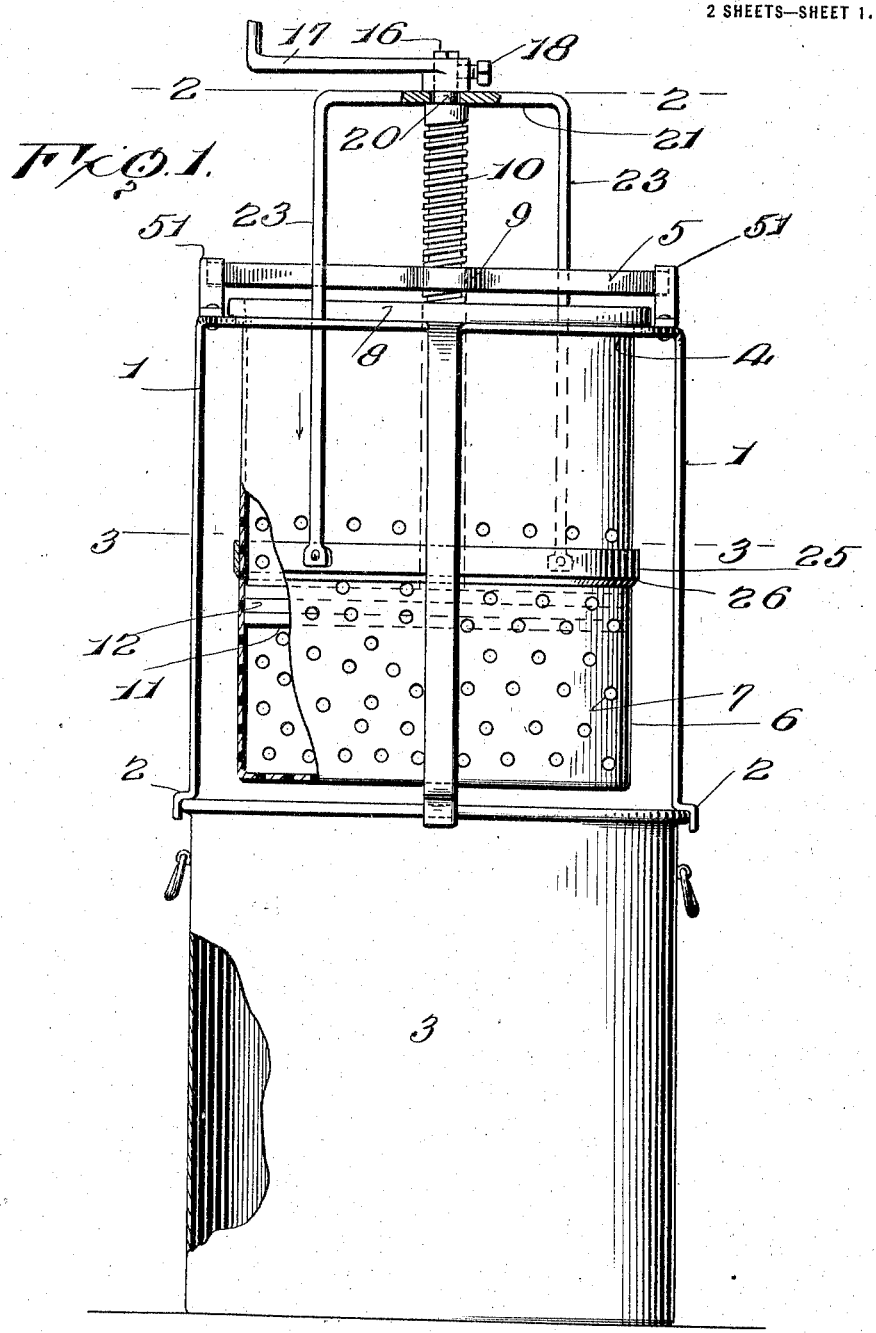

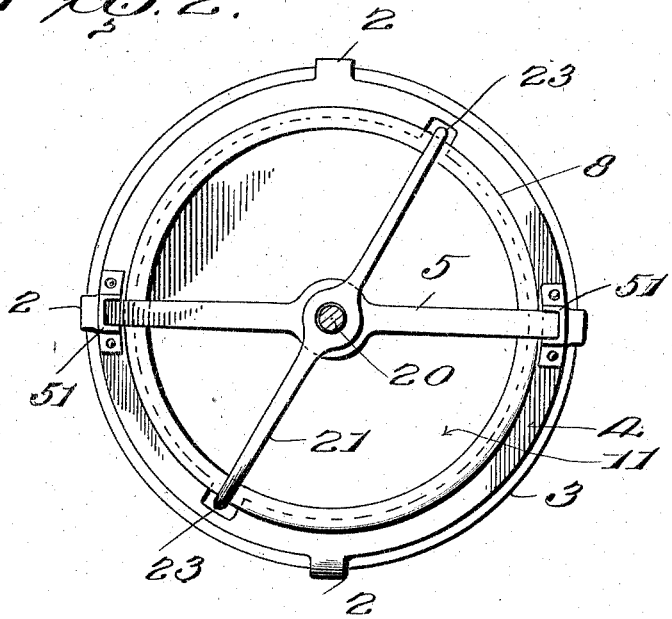
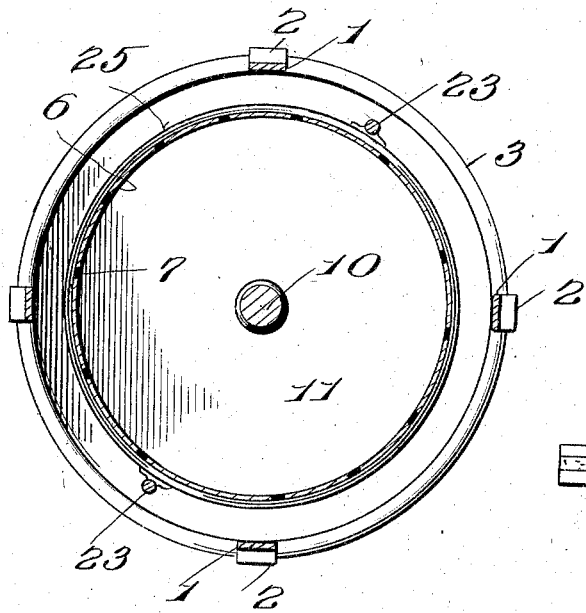
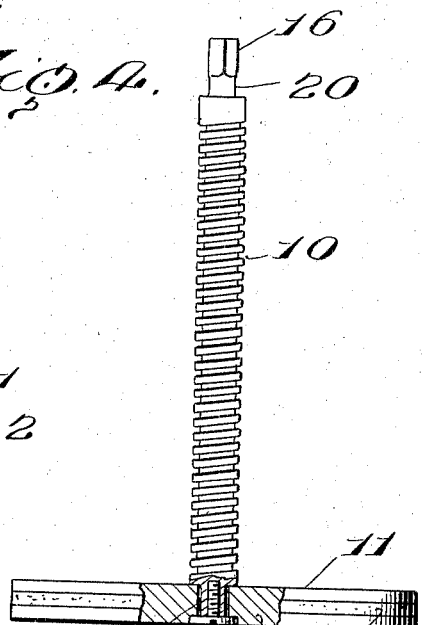

CHARLES H. FOWLER, OF BOSTON, MASSACHUSETTS.

PRESS.

1,307,965.   Specification of Letters Patent.   Patented June 24, 1919.

Application filed August 30, 1918. Serial No. 252,058.

*To all whom it may concern:*

Be it known that I, CHARLES H. FOWLER, a citizen of the United States, residing at Boston, in the county of Suffolk and State of Massachusetts, have invented certain new and useful Improvements in Presses, of which the following is a specification.

This invention relates to presses and has for its object the provision of a simple, compact and efficient mechanism which may be supported over an ordinary household container and easily manipulated to extract juices from fruits, to mash potatoes, or for other purposes. The invention is illustrated in the accompanying drawings and consists in certain novel features which will be hereinafter first fully described and then more particularly pointed out in the appended claims.

In the drawings:

Figure 1 is a view partly in elevation and partly in section of a press embodying my improvements in position upon a container;

Fig. 2 is a horizontal section on the line 2—2 of Fig. 1;

Fig. 3 is a horizontal section on the line 3—3 of Fig. 1;

Fig. 4 is an enlarged detail sectional elevation of the piston.

In carrying out my invention, I employ a supporting frame consisting of standards or legs 1 having their lower ends offset, as shown at 2, whereby they may engage over the upper edge of an ordinary household container 3 to support the press in position thereon, a ring 4 being carried by the upper ends of said legs and a guide-bar 5 extending diametrically across the same. I also employ a colander or hopper 6 provided with perforations 7 in its bottom and in the lower portion of its side, said colander or hopper being preferably cylindrical and of somewhat less diameter than the container 3. At its upper end the hopper is provided with an annular flange or rim 8 which is adapted to rest upon the ring or annular support 4 so that the colander will be maintained in proper position over the container. The guide-bar 5 is spaced from the top of the hopper and at its center is constructed with a bearing 9 for a worm or threaded piston or plunger rod 10 which carries the piston head or plunger 11 at its lower end. The guide bar is preferably angular in cross-section and its ends are engaged in correspondingly shaped sockets 51 provided at diametrically opposite points of the supporting ring 4. The bar is thus held against rocking or turning movement and the operation of the plunger will be smooth and even. The plunger 11 is provided with packing 12 in its periphery so that it will form a close joint with the inner surface of the hopper and thereby prevent the fruit or vegetables placed in a hopper working up between the wall of the same and the edge of the plunger. The lower extremity of the plunger rod 10 is reduced, as shown at 13, so as to extend through a central opening in the plunger, and a screw 15 is inserted through the plunger into the end of the plunger rod whereby the plunger will be retained in position, the head of the screw fitting in a shallow recess in the under side of the plunger as shown in Fig. 4. The upper extremity of the plunger rod is likewise reduced, as shown at 16, and a crank 17 or other form of handle is secured upon the said reduced portion 16, which is angular, by a screw 18, so that if the handle be rotated the plunger rod will be likewise rotated and caused to ascend or descend through the guide-bar 5 so that the plunger will be likewise moved up or down in the hopper. The reduced portion 16 of the upper end of the plunger rod has a circular portion 20 immediately adjacent the main portion of the plunger rod and upon this circular portion is mounted a cross head 21, the ends of the cross head being turned downward to form hangers 23 which have their lower ends secured at diametrically opposite points of a scraping ring 25 which fits closely around the outer surface of the hopper and has its lower edge beveled, as shown at 26.

The construction and arrangement of the several parts being thus made known, it is thought the uses of the device will be readily understood. The fruit or vegetables having been placed in the hopper, the plunger and guide bar are assembled therewith after which the apparatus is placed upon the container in the position shown in Fig. 1. The handle wheel 17 is then rotated in the proper direction to cause the plunger to descend in the hopper and this movement of the plunger will cause it to press upon the substances below it and compress the same, the continued movement forcing the juices and pulp through the perforations 7. Some of the pulp will tend to adhere to the outer surface of the hopper around the perforations but this adhering matter will not be lost inasmuch as the annular scraper 25 will follow the movement of the plunger and consequently ride down upon the exterior of the hopper and remove therefrom all such matter. The compressed and crushed fruit or vegetable substance will drop from the hopper into the container in condition for use as will be readily understood. The hangers which carry the scraper will pass through the supporting ring 4 and will be guided by the same, while the bar 5 furnishes an effective guide and bearing for the plunger rod. The supporting frame will engage the top of the container in such manner that the press will be firmly supported and will be in such a position relative to the container that the material forced from the hopper will pass at once into the container. When it is desired to clean the press, the set screw 18 is removed and the handle lifted off the plunger rod. The scraper frame is then raised so that the head 21 will clear the end of the plunger rod and the guide bar is then lifted from the sockets 51, withdrawing the plunger from the colander. The colander is then lifted off the supporting frame and the scraper and colander may be easily separated.

Having thus described my invention, what is claimed as new is:

1. In a vegetable press, the combination of a colander, a plunger disposed within the colander, a scraper mounted upon the exterior of the colander, and means whereby the scraper and the plunger will be caused to move simultaneously in the same direction.

2. A vegetable press comprising a supporting frame, a colander having its upper end resting upon said frame, a plunger disposed within the colander, a guide on the supporting frame at the center thereof, a plunger rod extending from the plunger through the said central guide and having a bearing therein, means for rotating the plunger rod whereby to effect movement of the plunger within the colander, a scraper mounted upon the exterior of the colander, and connections between said scraper and the plunger rod, said connections being guided by the supporting frame at the sides thereof.

3. In a vegetable press, the combination of a supporting frame comprising standards, a ring carried by said standards, a guide bar extending across said ring, a colander resting on and depending from said ring, a plunger within the colander, a plunger rod rising from the plunger through the guide bar, a cross head swiveled upon the plunger rod, hangers depending from the cross head and extending through and guided by the said supporting ring, an annular scraper carried by the lower ends of said hangers and bearing against the outer surface of the colander, and means for rotating the plunger rod.

4. In a vegetable press, the combination of a supporting frame comprising standards having their lower ends offset to engage the top of a container, a supporting ring carried by the upper ends of said standards and a cross bar extending diametrically across the said ring, a colander resting on the supporting ring, a plunger slidably fitted in the colander, a threaded plunger rod having its lower end swiveled in the plunger and its intermediate portion passing through and engaging the guide bar, and means at the upper end of the plunger rod for rotating the same.

In testimony whereof I affix my signature.

CHARLES H. FOWLER. [L. S.]

Copies of this patent may be obtained for five cents each, by addressing the "Commissioner of Patents, Washington, D. C."